(12) United States Patent
McLean

(10) Patent No.: US 11,232,469 B1
(45) Date of Patent: Jan. 25, 2022

(54) SYSTEM AND METHOD OF IDENTIFYING AUDIENCE DEMOGRAPHICS AND DELIVERING RELATIVE CONTENT TO AUDIENCE

(71) Applicant: ESD Technologies, Inc., Mentor, OH (US)

(72) Inventor: Marc Thomas McLean, Mentor, OH (US)

(73) Assignee: ESD TECHNOLOGIES, INC., Mentor, OH (US)

( * ) Notice: Subject to any disclaimer, the term of this patent is extended or adjusted under 35 U.S.C. 154(b) by 0 days.

(21) Appl. No.: 17/487,220

(22) Filed: Sep. 28, 2021

Related U.S. Application Data

(63) Continuation of application No. 17/232,346, filed on Apr. 16, 2021.

(60) Provisional application No. 63/014,279, filed on Apr. 23, 2020.

(51) Int. Cl.
*G06Q 30/02* (2012.01)
*G06K 9/00* (2006.01)
*H04L 29/06* (2006.01)

(52) U.S. Cl.
CPC ..... *G06Q 30/0204* (2013.01); *G06K 9/00295* (2013.01); *H04L 65/4069* (2013.01)

(58) Field of Classification Search
CPC ............ G06Q 30/0204; G06K 9/00295; H04L 65/4069
See application file for complete search history.

(56) References Cited

U.S. PATENT DOCUMENTS

| | | | |
|---|---|---|---|
| 7,921,036 B1 | 4/2011 | Sharma et al. | |
| 9,122,752 B2 | 8/2015 | Bill | |
| 9,690,978 B2 | 6/2017 | Yamada et al. | |
| 2004/0059659 A1 | 3/2004 | Safaei et al. | |
| 2006/0170945 A1 | 8/2006 | Bill | |
| 2008/0004951 A1 | 1/2008 | Huang et al. | |
| 2015/0341572 A1* | 11/2015 | Kelder ............ | H04R 1/08 348/231.4 |
| 2017/0228747 A1 | 8/2017 | Prandoni et al. | |
| 2017/0345044 A1 | 11/2017 | Prandoni et al. | |

(Continued)

OTHER PUBLICATIONS

International Search Report and Written Opinion from PCT/US21/27606 dated Jul. 28, 2021 (15 pages).

(Continued)

*Primary Examiner* — Arvin Eskandarnia
(74) *Attorney, Agent, or Firm* — Calfee, Halter & Griswold LLP

(57) ABSTRACT

A system and method is disclosed for identifying demographics of an audience (e.g., customers, shoppers and the like) using machine learning and delivering relative content to the audience. In one embodiment, a processing unit receives images and/or audio of an audience and uses a machine learning logic to identify audience demographical characteristics. Demographical characteristics are used to select and deliver audio entertainment, and/or audio information, and/or visual entertainment and/or visual information to the audience that is relevant to the audience. In other embodiments, demographic information is used to analyze audience or customer demographics based on time periods (hour, day, week, etc.), location(s), and/or point of sale data.

20 Claims, 10 Drawing Sheets

(56) References Cited

U.S. PATENT DOCUMENTS

2020/0021875 A1\* 1/2020 Ensing ............. H04N 21/41415
2020/0151757 A1 5/2020 Dodge et al.

OTHER PUBLICATIONS

"Driving brand loyalty with emotion", Deloitte Digital, May 23, 2019 (https://www.deloittedigital.com/us/en/blog-list/2019/driving-brand-loyalty-with-emotion.html), 8 pages.
Jäncke, Lutz. "Music, Memory and Emotion." Journal of Biology 7, No. 6 (Aug. 8, 2008): 21. doi:10.1186/jbiol82, 6 pages.
"Why We're Obsessed With Music From Our Youth" Neuroscience News, Feb. 14, 2021 (https://neurosciencenews.com/music-youth-17765/), 5 pages.
"Why an Emotional Connection Matters in Loyalty and How to Achieve It" Oracle Modern Marketing Blog, Feb. 15, 2020 (https://blogs.oracle.com/marketingcloud/post/why-an-emotional-connection-matters-in-loyalty-and-how-to-achieve-it), 5 pages.
"Why playing the 'right' background music increases sales", Fastcasual.com, Apr. 5, 2017 (https://www.fastcasual.com/articles/study-playing-the-right-background-music-increases-sales/), 1 page.
Yarrow, Kit. "Decoding the New Consumer Mind: How and Why We Shop and Buy," San Francisco, CA: Jossey-Bass, 2014, Chapter 1, 42 pages.
"Emotion Inspires, How Brands Use Music to Engage People," PlayNetwork.com (2018) (84 pages).
The Subliminal Influence of Ambient Music on Shoppers, 6 pgs, (https://www.psychologistworld.com/behavior/ambient-music-retail-psychological-arousal-customers#references (accessed Apr. 22, 2020)).
Burton, "The Psychology of Restaurant Music," Psychology Today, posted Jul. 4, 2014, 2 pgs, (https://www.psychologytoday.com/us/blog/hide-and-seek/201407/the-psychology-restaurant-music (accessed Apr. 22, 2020)).
Ong "Our Musical Tastes Peak as Teens, Says Study", The Verge, Dec. 12, 2018, 2 pgs, (https://www.theverge.com/2018/12/17003076/spotify-data-shows-songs-teens-adult-taste-music (accessed Apr. 22, 2020)).

\* cited by examiner

SYSTEM AND METHOD OF IDENTIFYING AUDIENCE DEMOGRAPHICS AND DELIVERING RELATIVE CONTENT TO AUDIENCE

CROSS-REFERENCES TO RELATED APPLICATIONS

This application is a continuation of U.S. patent application Ser. No. 17/232,346, filed Apr. 16, 2021, titled System and Method of Identifying Audience Demographics and Delivering Relative Content to Audience, which claims priority to U.S. Provisional Patent Application Ser. No. 63/014,279, filed Apr. 23, 2020 titled System and Method of Identifying Audience Demographics and Delivering Relative Content to Audience, all of which are hereby incorporated by reference.

BACKGROUND

Studies have shown that background or ambient music or songs can have an influence on shopper or customer behavior. See https://www.psychologistworld.com/behavior/ambient-music-retail-psychological-arousal-customers#references (accessed Apr. 22, 2020); https://www.psychologytoday.com/us/blog/hide-and-seek/201407/the-psychology-restaurant-music (accessed Apr. 22, 2020); and https://www.theverge.com/2018/2/12/17003076/spotify-data-shows-songs-teens-adult-taste-music (accessed Apr. 22, 2020) and references cited therein. In some instances, ambient music has been shown to contribute to a positive shopping experience.

However, most ambient music is selected from a predetermined playlist or station, which may or may not enhance the behavior of shoppers or customers because of their demographics (e.g., age, sex, race, etc.) What is desired are improved systems and methods for enhancing shopper and/or customer behavior through audio and/or visual media, signals, or outputs. What is also desired are improved systems and methods for demographically analyzing sales information including, for example, Point of Sale information.

SUMMARY

According to one embodiment, a system and method of identifying demographics of an audience using machine learning is provided. The method includes capturing images of an audience (e.g., customers, shoppers, and the like). The images are used to develop or infer demographical information about the audience. This demographical information is used to deliver relevant or targeted audio/video entertainment and/or audio/video information.

It is therefore an object of the present inventions to use one or more audience (e.g., customer, shopper or the like) demographics to further enhance the shopping experience.

It is also an object of the present inventions to provide analyses, feedback, and output of audience demographics.

It is also an object of the present inventions to provide sales and demographic analyses and outputs.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION

Figure 1:
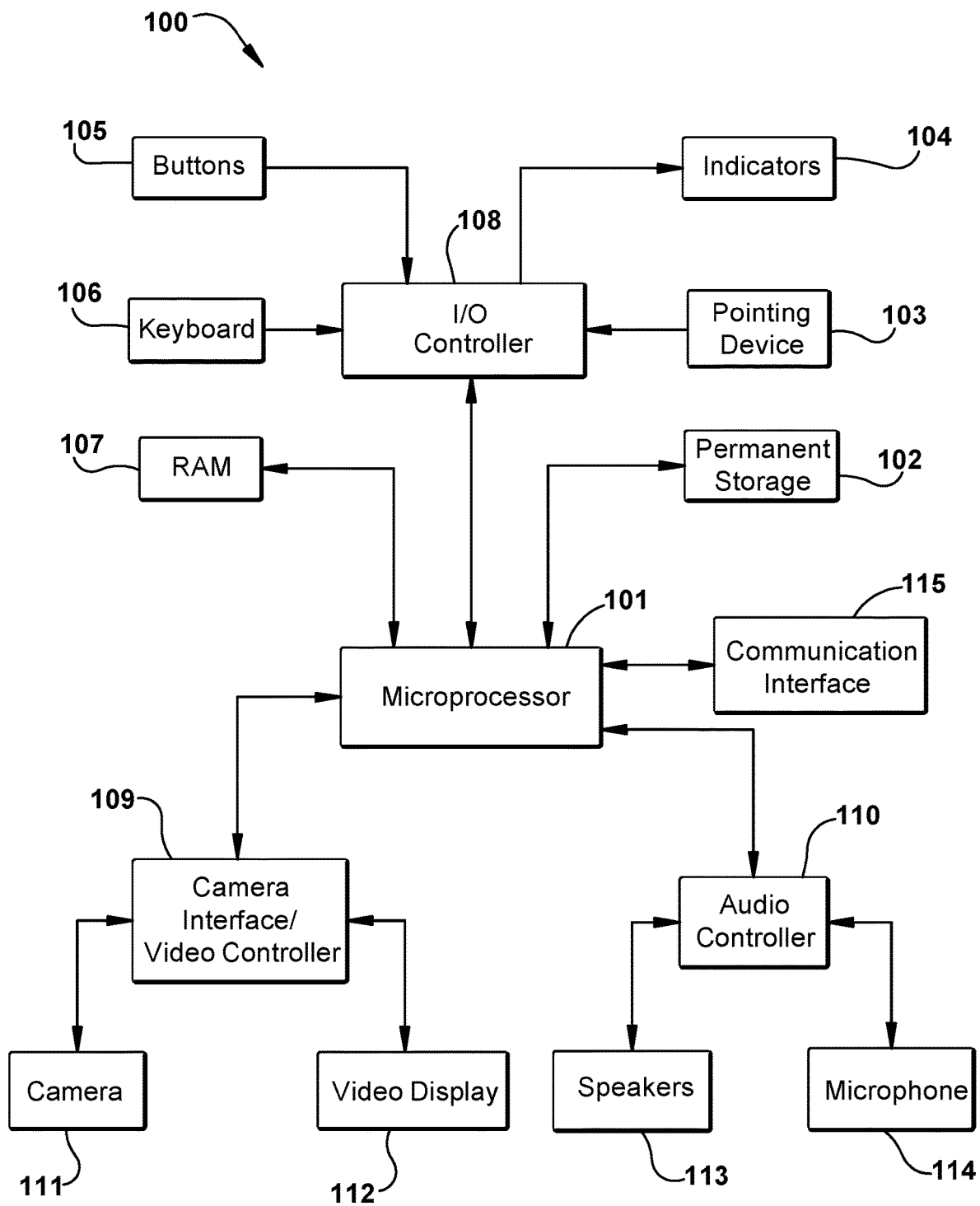
FIG. 1 illustrates one embodiment of a system and method used to capture images of an audience.

Prior to discussing the various embodiments, a review of the definitions of some exemplary terms used throughout the disclosure is appropriate. Both singular and plural forms of all terms fall within each meaning and the definitions are meant to be illustrative and not exclusive:

"Software," as used herein, includes but is not limited to one or more computer readable and/or executable instructions that cause a computer or other electronic device to perform functions, actions, and/or behave in a desired manner. The instructions may be embodied in various forms such as routines, logics, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Machine Learning" or "Machine Learning Logic", as used herein, is a computer software that is used to perform a specific task without using explicit instructions, relying instead on patterns and inference.

"ROM", as used herein, includes any read only memory. ROM may be included in a single chip processor or may be a separate integrated circuit.

"RAM", as used herein, includes any random access memory. RAM may be included in a single chip processor or may be a separate integrated circuit.

"Permanent Storage", as used herein, includes any computer data storage that retains its data when the device is unpowered, including for example ROM.

"I/O Controller", as used herein, includes any computer microchip or software that provides communication between the microprocessor and peripheral devices.

"Pointing Device/Mouse", as used herein, includes any device that controls a computer display's cursor or pointer.

"Keyboard", as used herein, includes any peripheral device that enables a user to input text into a computer.

"Buttons", as used herein, includes any peripheral device that enables a user to input a triggering event to a computer.

"Indicators", as used herein, includes any peripheral device that is used to signal an event.

"Microprocessor", as used herein, includes a component that performs the instructions and tasks involved in computer processing.

"Video Controller", as used herein, includes any computer component that allows graphic information to be displayed and any video display device.

"Audio Controller", as used herein, includes any computer component that allows audio information to be input to a microprocessor or output from a microprocessor.

"Camera", as used herein, includes any computer device for recording visual images in the form of a picture or video.

"Video Display", as used herein, includes any computer device the provides information in a visual form.

"Speakers", as used herein, includes any computer device the provides information in an audible form.

"Microphone", as used herein, includes any computer device for recording audible information.

Figure 2:
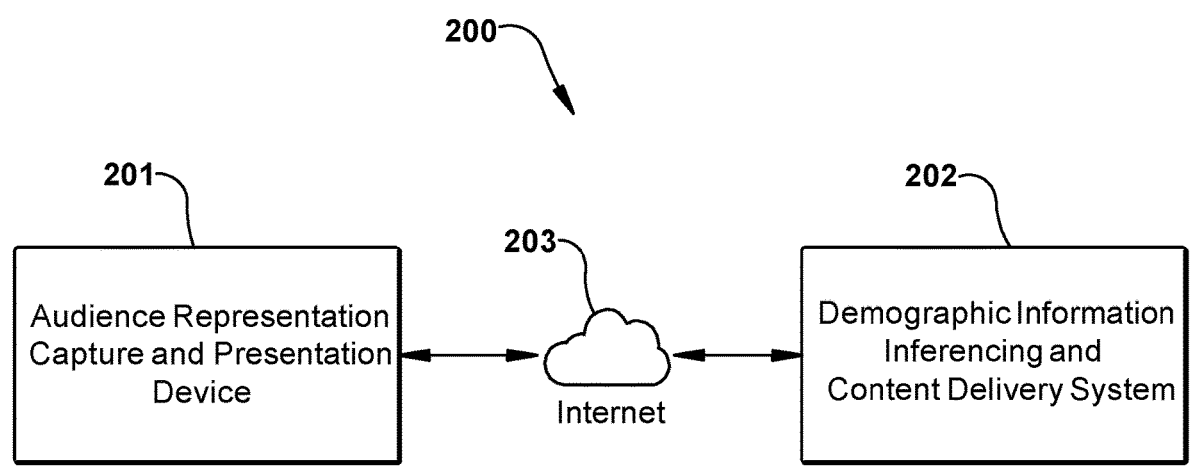
FIG. 2 illustrates one embodiment of an audience representation capture and presentation system and method and a demographic information inferencing and content delivery system and method.

Shown in FIG. 1 is a high-level block diagram illustrating an example system 100 for implementing the Audience Representation Capture Device 201 of FIG. 2, and the Demographic Information Inferencing and Content Delivery System 202 of FIG. 2. The system may include, but is not limited to, at least one microprocessor 101, permanent storage 102, pointing device/mouse 103, indicators 104, buttons 105, keyboard 106, random access memory (RAM) 107, I/O controller 108, camera interface/video controller 109, audio controller 110, camera 111, video display 112, speakers 113, microphone 114 and communication interface 115. Pointing device/mouse 103, indicators 104, buttons 105, keyboard 106, microphone 114 and video display 112 are optional components. In other embodiments, system 100 can have different architectures and more or less of the described components can be included. System 100 executes logic for providing the functionality described herein. As used herein, the term "logic" refers to computer program logic used to provide the specified functionality. Thus, logic can be implemented in hardware, firmware, and/or software. In one embodiment, logic is stored in permanent storage 102 loaded into random access memory 107 and executed by microprocessor 101.

Referring now to FIG. 2, one embodiment of a system and method 200 is shown. System and method 200 has an Audience Representation Capture Device and Demographic Information Inferencing and Content Delivery System. Shown is only one client-side device 201 and one server-side device 202 but there may be multiple instances of each of these devices. The client-side device 201 can be located in a geographic location that is customer driven such as, for example, a commercial establishment, retail store, service center, restaurant, bar, arena, etc. In other embodiments, multiple geographic locations may be present with each having a client-side device 201 and one or more server-side devices 202 communicating therewith.

In one embodiment, the Audience Representation Capture Device 201, is a client-side device having logic for capturing one or more images of the audience (e.g., shoppers, customers, etc.) present at one or more geographic locations (e.g., a retail store), extracting images of people's faces, if present, and sending the images of faces over the Internet 203 (or other communication media (e.g., intranet, wired LAN, etc.)), to the Demographic Information Inferencing and Content Delivery System 202. In other embodiments, the Audience Representation Capture Device 201 may send the captured images to the Demographic Information Inferencing and Content Delivery System 202 for extraction. The Demographic Information Inferencing and Content Delivery System 202, is a server-side device which receives images of faces and using one or more machine learning logic(s) infers demographic information about the image, including but not limited to, age, gender, race, emotion, estimated income level, estimated social preferences, estimated style and appearance preferences, estimated residence location, etc. In one embodiment, the Demographic Information Inferencing and Content Delivery System 202, returns to the Audience Representation Capture Device 201, a song(s) and/or an advertisement(s) and/or other targeted media messages to the audience based upon one or more of the inferred demographics. Media as used herein throughout includes, but is not limited to, audible and/or visual information including sounds, music, songs, messages, pictures, video, graphics, text, etc. and combinations of the foregoing.

Figure 3:
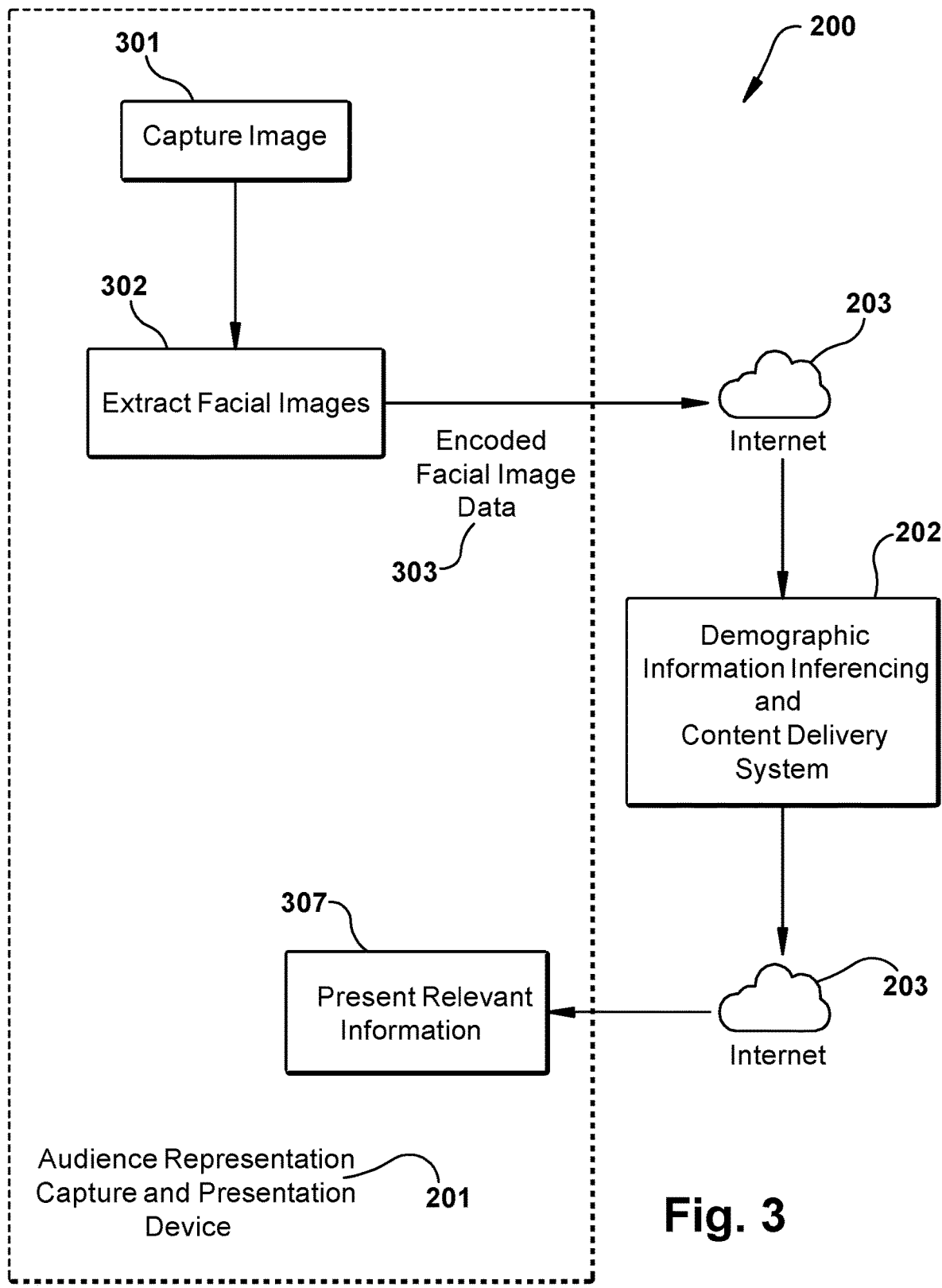
FIG. 3 illustrates one embodiment of a flow diagram of an audience representation capture and presentation system and method and demographic information inferencing and content delivery system and method.

Referring now to FIG. 3, one embodiment of logic for the Audience Representation Capture and Presentation System 201 and Demographic Information Inferencing and Content Delivery System 202 is shown. The logic or flow diagram(s) shown and described herein do not depict syntax of any particular programming or software language. Rather, the flow diagram(s) illustrate the functional information that may be used to fabricate circuits or computer software to perform the processing of the system. It should be noted that many routine program elements, such as initialization of loops and variables and the use of temporary variables are not shown. Furthermore, the exact order of the process steps need not necessarily be performed in the order shown or described herein and may be modified to exclude certain steps.

Still referring to FIG. 3, the Audience Representation Capture Device 201 captures an image of the audience (e.g., customers or shoppers in the example of a commercial store location) in block 301 using camera 111 (FIG. 1) and stores the image in Random Access Memory 107 (FIG. 1). Facial images are extracted in block 302 from the image captured in block 301 via a computer vision process (as described in more detail hereinafter) and encoded for HTTP transfer over, for example, the Internet (other transfer encoding protocols can also be used). Computer vision as used herein generally refers to the ability of a computer system to identify and process images to provide an appropriate output (e.g., identification of faces or other objects in an image). While any suitable computer vision process or method can be used to extract facial images and information, one method uses a neural network to identify facial vectors appearing (or not) in the captured image.

The encoded facial image data or information 303 is transmitted over the Internet 203 to the Demographic Information Inferencing and Content Delivery System 202. The Demographic Information Inferencing and Content Delivery System 202 receives the encoded facial image(s) information. The encoded facial image data or information 303 is decoded using logic 500 in FIG. 5 for demographic analysis and/or inferencing.

Referring again to FIG. 3, in one embodiment, facial recognition and image capture can be done by artificial intelligence or machine learning logic (e.g., in block 302) that has been trained through a neural network (or equivalent) to identify the similarity between a face captured by the camera image and one or more faces (and/or facial features) stored in an Inferencing database. The Inferencing database has a library of facial images and demographic information associated therewith. In one embodiment, the similarity comparison can be accomplished by identifying a face in the captured image, identifying specific features in the face, generating face coding vectors (which can be of varying range, but 128 is one preferred value) and comparing the face coding vectors (and/or facial features) to the face coding vectors of the images in the Inference database. In this manner, the captured facial image information is matched (e.g., in block 202) with one or more facial images and demographic information in the Inferencing database. The demographic information is then associated or encoded with the captured facial image for later analysis. This is just one example of comparison logic and it is not critical to the embodiments herein the precise method by which facial images are extracted, identified or associated demographic information inferred. as described by the above example. Demographical information is inferred from the decoded facial image data as described and further described below. Based on the inferred demographic information, music, advertising and/or other targeted messages relevant to the demographic properties inferred is sent to the Audience Representation Capture Device 201 over the Internet 203 and presented to the audience or customers in 307.

Figure 4:
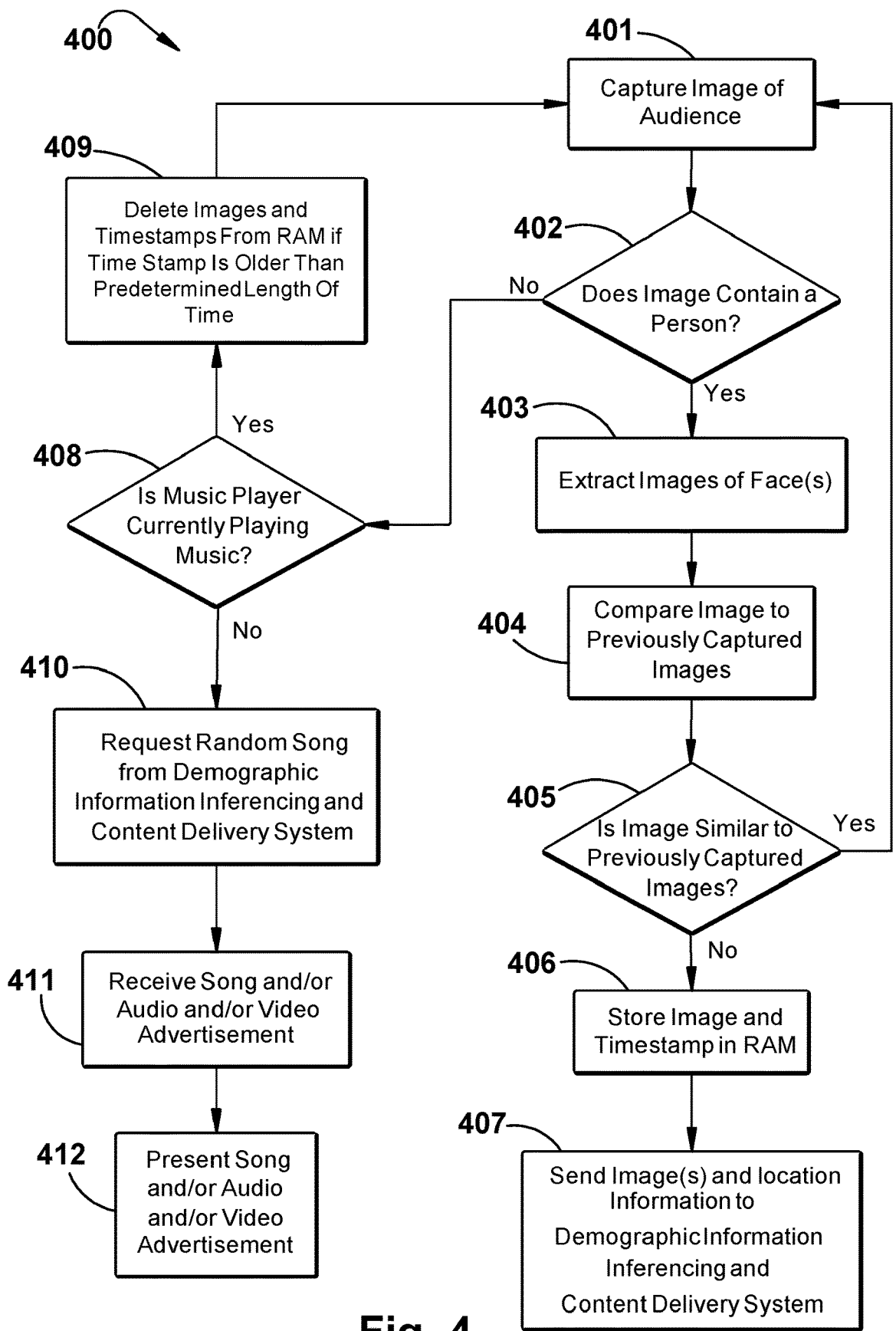
FIG. 4 illustrates one embodiment of a flow diagram for an audience representation capture and presentation logic.

Shown in FIG. 4 is one embodiment of the Audience Representation Capture and Presentation Logic 400. The logic 400 manages the geographical location in real time by checking and re-checking for the presence of individual members of the audience or customers at that location. This is done by identifying individual members of the audience or customers and ordering their identification for priority, which can be time-based on the identification. The order can be used to define the order of audio (e.g., music and/or advertisements) and video messages to be delivered to the geographic location. In one example, the Audience Representation Capture and Presentation Logic 400 captures an image of an audience or customers in block 401 and stores the image in random access memory 107. A test is performed to determine if the image contains image(s) of a person (e.g., one or more faces) in block 402. If the image does not contain a person, the logic 400 performs another test in block 408 to determine if a song is currently playing in audio controller 110, which plays or streams digital audio/video content to the geographic location. If a song is currently playing, facial images with a timestamp greater than a predetermined time (e.g., 5, 10, 15, 20 minutes or more) are deleted in block 409 from random access memory 107. This time-based order analysis illustrates the example of elapsed time indicating the likelihood the person is no longer in the geographic location or retail store. In one embodiment, if a song is not currently playing, a request is sent in block 410 to the Content Delivery System Random Song Selection Logic 600 to retrieve and stream a random song or audio/video message, which can also be an advertisement. A song and/or audio and/or video advertisement is received in block 411 from Content Delivery System Random Song Selection Logic 600. The song and/or audio and/or video advertisement is presented to the audience or customers in block 412.

Continuing in FIG. 4, if the image does contain a person in block 402, the facial images are extracted in block 403 as previously described to obtain inferred demographic information. The facial image is compared to previously captured facial images in block 404 that are stored in random access memory 107. If the facial image is found to be similar to other images in random access memory 107, the image is deleted in block 405 (as, for example, redundant) and program execution returns to capturing another image in block 401. If the facial image is not found to be similar to other images stored in random access memory 107, the image is stored in block 406 in random access memory 107 for inferring demographic information as previously described. A timestamp identifying the time when the image was store in random access memory 107 is also stored in random access memory 107 in block 406. The facial image and client-side device location information is sent in block 407 to the Demographic Information Inferencing and Content Delivery System Logic 500 for processing (FIG. 5).

Figure 5:
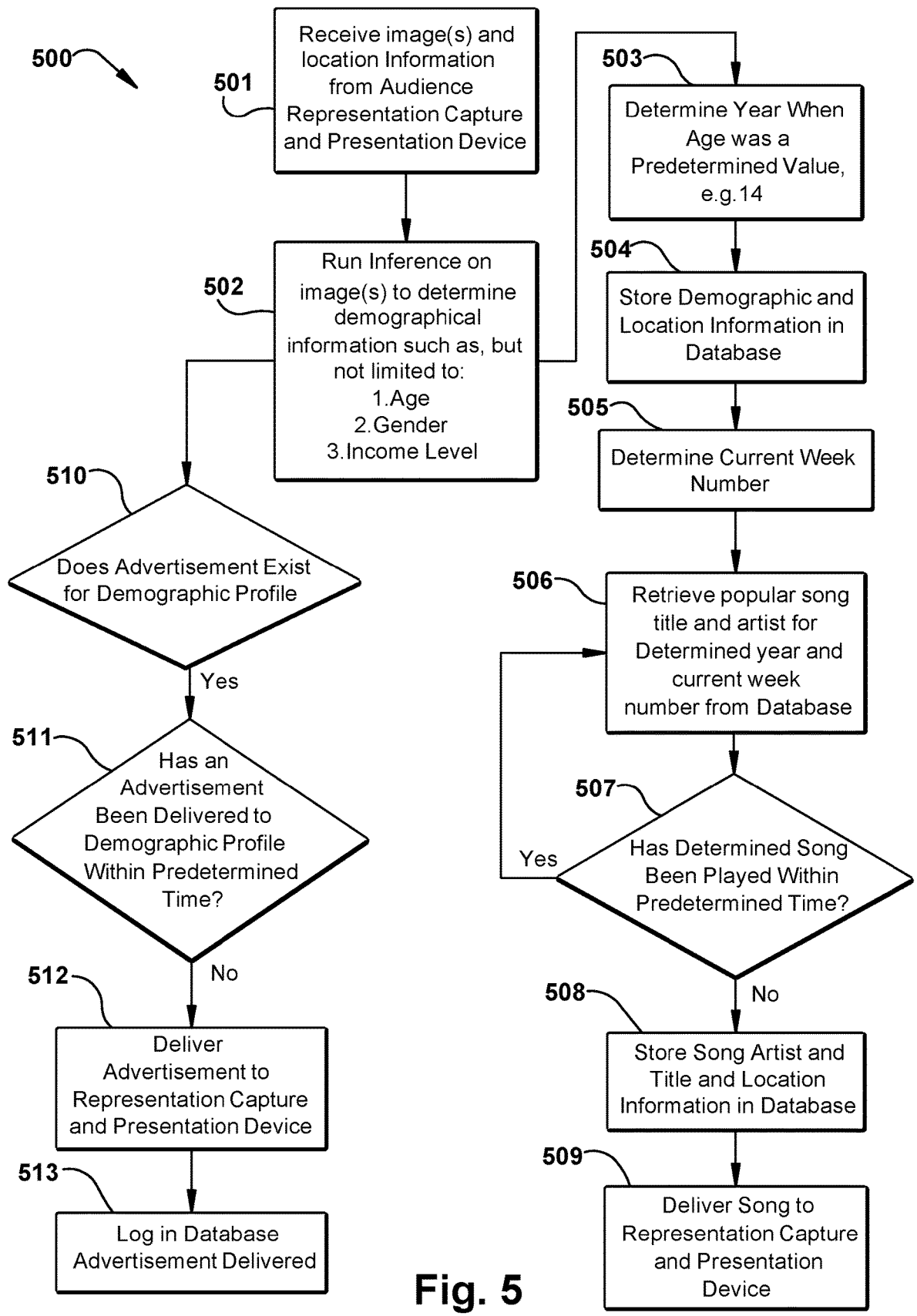
FIG. 5 illustrates one embodiment of a flow diagram for a demographic information inferencing and content delivery logic.

Referring now to FIG. 5, shown is one embodiment of the Demographic Information Inferencing and Content Delivery System Logic 500. The Demographic Information Inferencing and Content Delivery System Logic 500 receives images and location data in block 501 from the Audience Representation Capture and Presentation Logic 400. The Demographic Information Inferencing and Content Delivery System Logic 500 infers demographical information such as, but not limited to, age, gender, emotion, income level, residence/geography, race, social preferences, style/fashion preferences, etc., from the image in block 502. The year in which the person in the image was a predetermined age, e.g., 14 years old, is determined in block 503 from the inferred demographic information. This is accomplished by inferring the person's age from the captured image and inferred demographic analysis and then adding or subtracting therefrom to arrive at the predetermined age for targeted audio and/or video message delivery to the geographic location of the captured image of the person. The demographical and location information is stored in a database in block 504 for later analysis (e.g., the number of customers at a specific location per hour or per day with specific demographic characteristics, etc., see also FIG. 7 and associated text). In block 505, the current week number of the current year is determined based on the inferred age demographic and the targeted predetermined age. In one embodiment, a song title and artist from a database is retrieved in block 506 that has a timestamp that is equal to the year determined in block 503 and the week number determined in block 505. In one example, the number #1 pop music song from the present week (e.g., week of Aug. 1st) for the year when the person was 14 years old is identified. Songs other than pop music and top (e.g., #1) can be used as well including, for example, metal, rap, country, hip-hop, techno, electronica, top 40, platinum, gold, silver, etc. can also be used. The criteria used to identify the audio/video message from the inferred demographic data is not critical so long as there is some association. The song title and timestamp is compared to a database in block 507 to determine if the song has already played within a predetermined time period (e.g., 15 min, 30 min, 1 hr., etc.) The timestamp previously generated in block 508 is compared to a predetermined time period in block 507. If the timestamp is within a predefined time in block 507, execution returns to block 506 for selection of another song. If the timestamp in block 507 is not within a predetermined time period, the song title, artist and timestamp is stored in a database in 508 for optional subsequent analysis (e.g., most played songs or messages, etc.). The song is then delivered in block 509 to the Audience Representation Capture and Presentation Logic 400 (e.g., FIG. 4, block 411) for presentation to the audience or customers (e.g., FIG. 4, block 412).

In addition, or in alternative, to determining the year in which the person in the image was a predetermined age, e.g., 14 years old, determined in block 503, an audio and/or video advertisement can be queried from the database in block 510 that matches the demographic profile identified in block 502. For example, if the inferred demographic information is female, age 20, a makeup advertisement can be retrieved and presented. Or, for example, if the inferred demographic information is male, age 60, an advertisement targeted to grandparents can be retrieved and presented. If an advertisement is returned from the query in block 510, a test is performed in block 511 to determine if the advertisement has been delivered within a predetermined time (similar to that described above in block 507). If the advertisement has not been delivered within the predetermined length of time, the advertisement is delivered in block 512 to the Audience Representation Capture and Presentation Logic 400 (e.g., FIG. 4, block 411) for presentation to the audience or customers (e.g., FIG. 4, block 412). The advertisement delivered is logged in a database in block 513 for subsequent analysis (e.g., most played advertisements, etc.).

Figure 6:
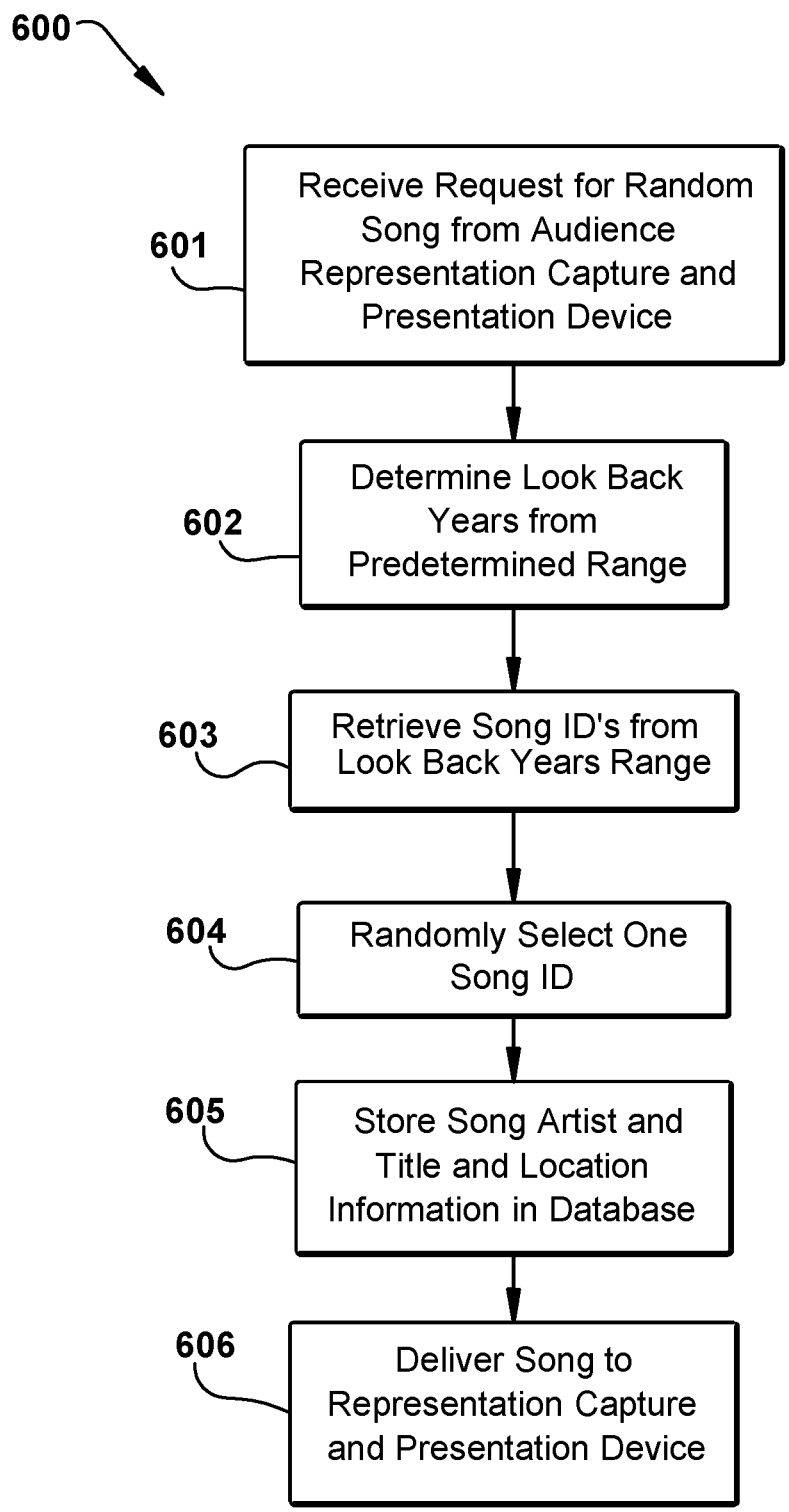
FIG. 6 illustrates one embodiment of a flow diagram for a random song selection logic of the demographic information inferencing and content delivery logic.

Referring now to FIG. 6, shown is one embodiment of the Demographic Information Inferencing and Content Delivery System Random Song Selection Logic 600. The Demographic Information Inferencing and Content Delivery System Random Song Selection Logic 600 receives a request for a random song, in block 601, from the Audience Representation Capture and Presentation Logic 400 (FIG. 4). A look back year range is calculated based on a predetermined range (e.g., 5 years, but any look back range in years or months can be used) in block 602. The song identification numbers with a release date within the range determined in block 602 are selected in block 603. One song identification number is randomly selected in block 604. The associated song title and artist and the Audience Representation Capture Device 201 location data are stored in a database in block 605, which can also be the same database used in FIGS. 4 and 5 for analytics. The song is delivered in block 605 to the Audience Representation Capture Device 201 for playing/streaming to the geographic location.

Figure 7:
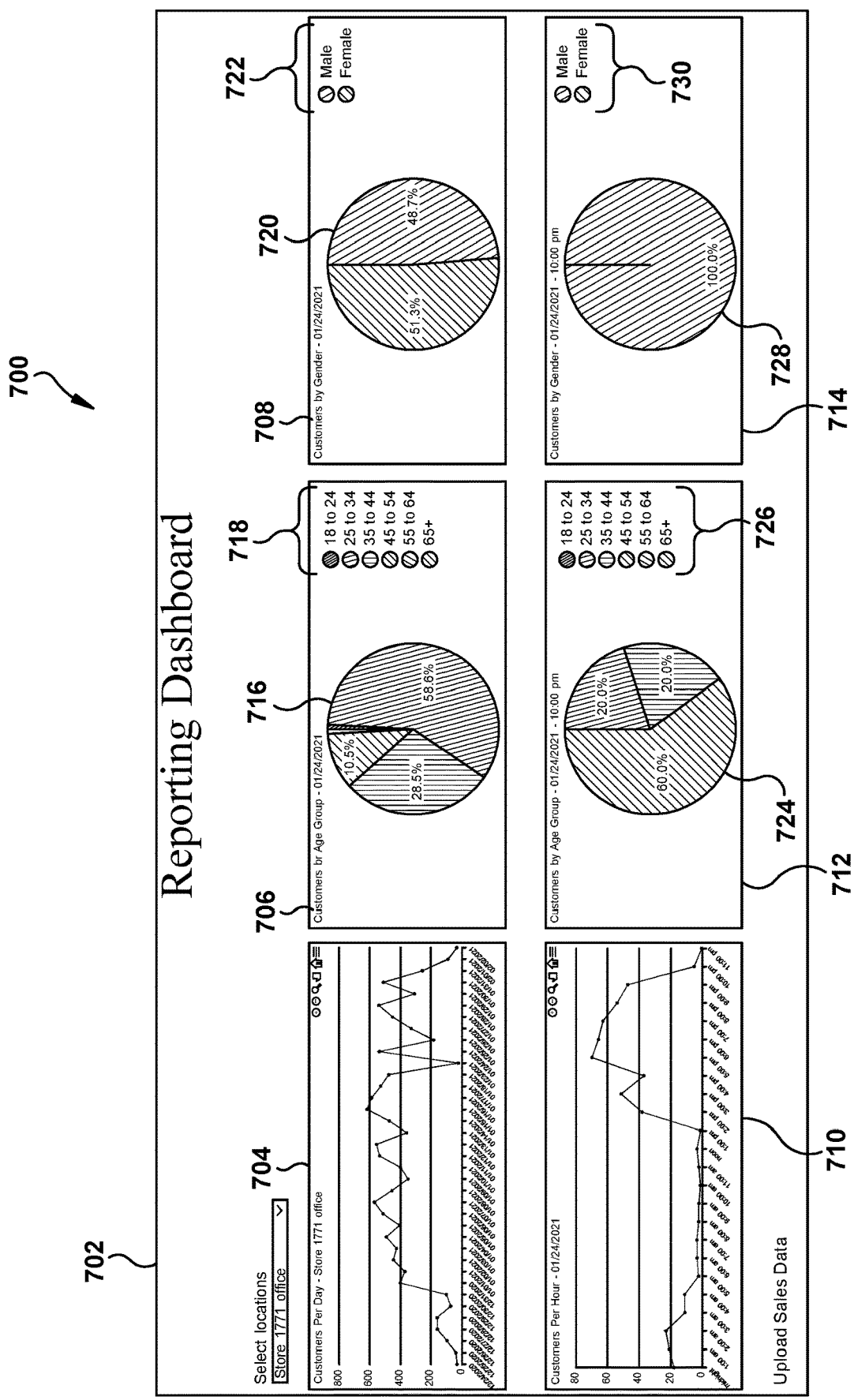
FIG. 7 illustrates one embodiment of logic and displays for analysis of demographic data/information.

Referring now to FIG. 7, one embodiment of logic and displays for analysis of demographic information is provided. The logic and display 700 can perform various analysis on the demographic data or information. This includes the demographic information such as age, gender and emotion can be reported on customers by location(s) per hour, day, week etc. In this example, logic and display 700 can produce a dashboard display 702 having a plurality of analyses and visual outputs 704, 706, 708, 710, 712, and 714. It should be noted that more or less of these analyses and outputs can be used in other embodiments.

Analyses and visual output 704 is one embodiment of a customers per day analysis of one retail or store location. In this embodiment, a line curve is used to represent the number of customers per day that entered the store location, but other graphical representations can also be used (e.g., bars, circle, pie, etc.) This analysis is generated by counting the facial images identified by the Audience Representation and Capture device 201 and/or the Demographic Information Inferencing system 202 that are associated with the store location. The analysis can also include logic for excluding employee(s) by recognizing their facial images and not including them in the count(s). While analyses and visual output 704 is shown for customers per day, in other embodiments this can include customers per other time periods including hour (see, e.g., analyses and visual output 710), weekend, week day, month, year, etc.

Analyses and visual output 706 is one embodiment of a customers by age group analysis of one retail or store location and on a particular date. In this embodiment, a pie chart 716 and legend 718 are used to represent the size of the customer age groups that entered the store location, but other graphical representations can also be used (e.g., bars, circle, line, etc.) This analysis is generated by counting the inferred age (or age range(s)/groups) associated with the facial images by the Demographic Information Inferencing system 202 for the store location. The analysis can also include logic for excluding employee(s) by recognizing their facial images and not including them in the count(s). Pie chart 716 shows data for age groups 18 to 24, 25 to 34, 45 to 54, 55 to 64 and 65+. More or less age groups and other age group ranges can also be used. While analyses and visual output 706 is shown for customers by age group for a particular day, in other embodiments this can include customers by age group for other time periods including hour (see, e.g., analyses and visual output 712 with pie chart 724 and legend 726), weekend, week day, month, year, etc.

Analyses and visual output 708 is one embodiment of a customers by gender analysis of one retail or store location and on a particular date. In this embodiment, a pie chart 720 and legend 712 are used to represent the size of the customer genders that entered the store location, but other graphical representations can also be used (e.g., bars, circle, line, etc.) This analysis is generated by counting the inferred gender associated with the facial images by the Demographic Information Inferencing system 202 for the store location. The analysis can also include logic for excluding employee(s) by recognizing their facial images and not including them in the count(s). Pie chart 720 shows data for male and female genders, but other gender groups may also be defined. While analyses and visual output 708 is shown for customer genders for a particular day, in other embodiments this can include customer genders for other time periods including hour (see, e.g., analyses and visual output 714 with pie chart 728 and legend 730), weekend, week day, month, year, etc.

Figure 8:
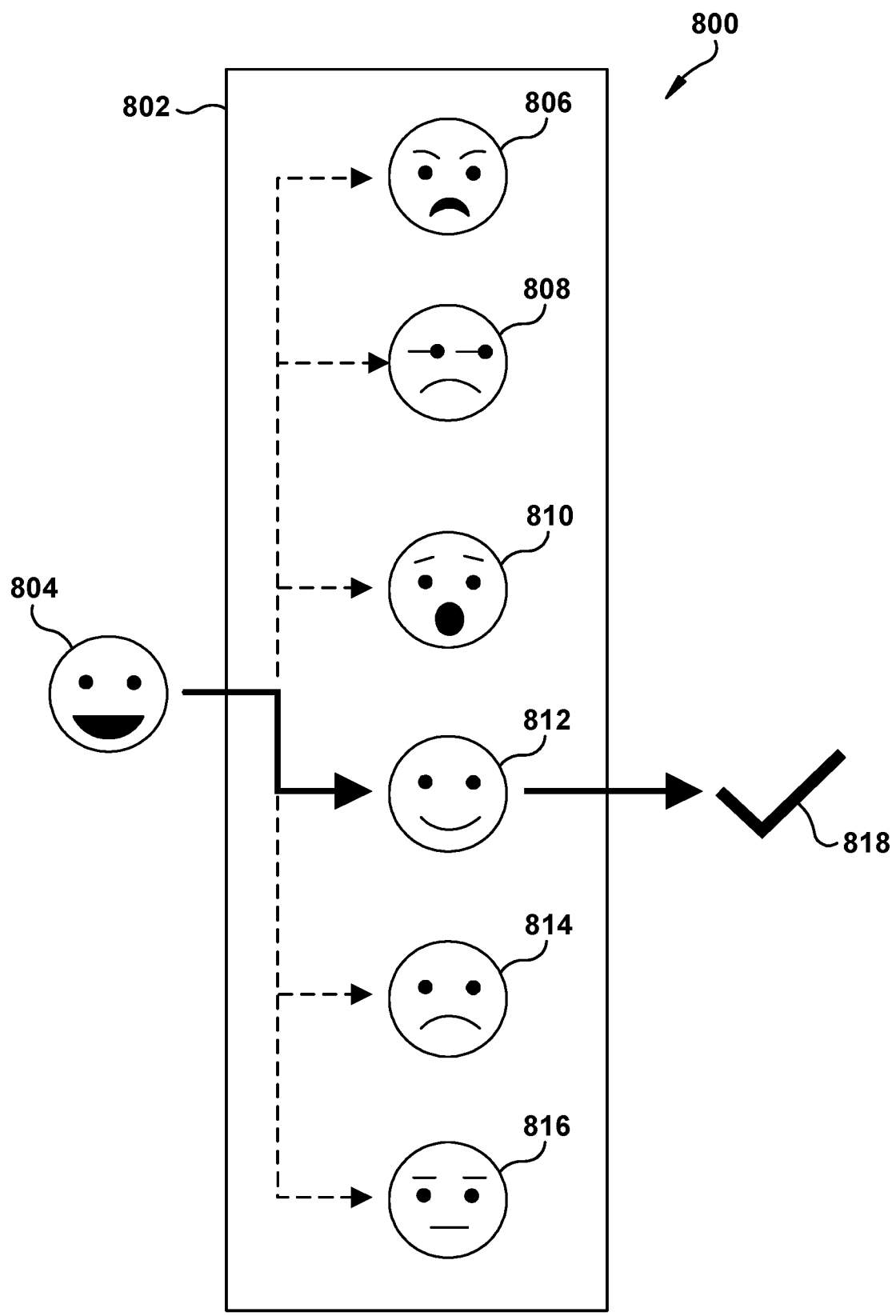
FIG. 8 illustrates one embodiment of machine learning logic for inferring at least one emotion state.

FIG. 8 illustrates one embodiment of emotion inferencing system and method/logic 800 that can be included with Demographic Information Inferencing system 202. Machine learning logic 800 infers the emotional state of a customer whose facial image 804 has been captured and identified by the Audience Representation Capture device 201. Logic 800 includes a machine learning algorithm which infers various emotional states including but not limited to, for example, anger 806, disgust 808, fear 810, happy 812, sad 814, and neutral 810. Other emotional states can also be included including surprise, disappointment, etc. The logic 800 machine learning compares the captured facial image 804 to a library 802 of emotional images to determine which emotion, e.g., 806-816, best matches the captured facial image 804. In one embodiment, this is accomplished by comparing facial vector data of the captured image 804 to the facial vector data of the library 802 of emotional images 806-816. In the embodiment shown, captured facial image 804 best matches the library/database of facial images for the happy 812 emotion. In other embodiments, captured facial image 804 may match more than one emotion 806-816. When the match(es) are identified, the logic associates the emotion(s) at 818 with the captured facial image 804. This can be done, for example, by storing the emotion(s) as data associated with the captured facial image 804 so later demographic analysis can be performed that includes at least emotion.

Figure 9:
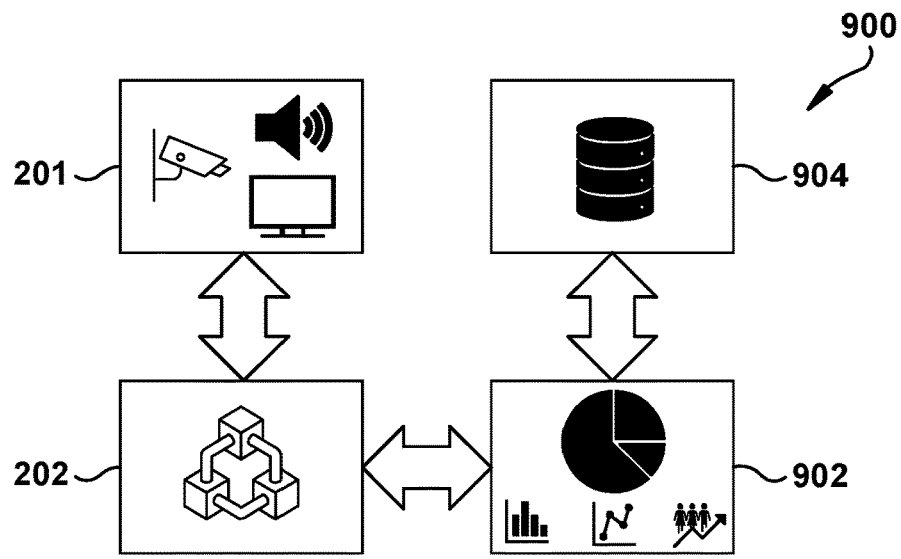
FIG. 9 illustrates one embodiment of system and logic for analyzing sales and demographic data.

Referring now to FIG. 9, one embodiment 900 of a system and method for providing point of sale (POS) and demographic analyses, feedback and output is illustrated. A system and method allow POS data and the inferred demographic information to be analyzed based on, for example, time(s), location(s) and/or demographics. This allows actual demographics to be connected to POS data. For example, the system and method allow for the generation of outputs that visualize sales of goods and/or services (e.g., via Stock Keeping Unit(s) (SKU's), Universal Product Code(s) (UPC's), or other tracking codes/numbers, etc.) versus demographic information. The demographic information/data (e.g., any one or more of age(s), gender, etc., as previously described herein throughout) can be that captured at a specific location(s), time(s), date(s), etc. The outputs can be visualized as graphics including, for example, pie, bar, line, etc. charts, numbers, etc. on a dashboard display, as previously shown and described (see, e.g., FIG. 8). For this analysis, trend lines can be generated (using statistical methods) and patterns can be identified revealing purchasing habits from, for example, specific demographic groups at certain locations and at certain times of the day. Thus, the system and method provide the advantage of analytics performed on data representing audience/customer demographics inferred from images captured from one or more locations and actual POS data from these location(s). This greatly reduces inaccuracies provided by other methods such as, for example, surveys. The system and method further allow the present analytics to be compared to historical demographic data/results via, for example, graphical outputs (e.g., charts, data, dashboards, etc.) to visual the comparison(s).

The system and method include, for example, Audience Capture and Representation device 201, Demographic Information Inferencing system 202, analytic engine 902 (which can include the logic and displays for analysis of demographic information shown and described in connection with FIG. 7), and POS data 904. The Audience Capture and Representation device 201 and Demographic Information Inferencing system 202 have been described earlier and reference is made to that discussion, which is incorporated herein. Audience Capture and Representation device 201 captures facial images of an audience or customers at a location (e.g., store) and Demographic Information Inferencing system 202 uses the facial images to infer one or more demographics therefrom.

Analytic engine 902 reads input selections for POS and demographic data analysis as may be defined by a user or may be previously stored in computer memory. POS data 904 provides its data to analytic engine 902 and Demographic Information Inferencing system 202 provides its demographic data to analytic engine 902 for analysis. POS data 904 can include any product/service information including but not limited to, for example, SKU's, UPC's, tracking codes, product descriptions (e.g., color, size, weight, servings, etc.), purchase quantities, purchase time, etc. POS data 904 can reside on a separate computer, server, or other system that is in communication with analytic engine 902 and allows the transfer of data queries and results between the two components. The communication can be via a wired and/or wireless local area network or wide area network (e.g., the Internet) or other network.

Demographic data/information can include any of the previously described demographics and including associated location(s) and times(s)/date(s). Thus, for example, analytic engine 902 may be queried to analyze and output the one or more SKU's sold on a particular day versus the number of customers present at the store location throughout that day (see, e.g., FIG. 11 further described below). Other analyses can include for example, which SKU's were purchased by a particular age, age group, and/or age range by date(s) and/or location(s). The foregoing examples are merely illustrative of the analyses that can performed and not intended to limit the analytics thereto. Any combination of analytics using at least one POS data 904 type and at least one demographic data type from Demographic Information Inferencing system 102 can be performed to provide outputs (or dashboards) that visual the results.

Figure 10:
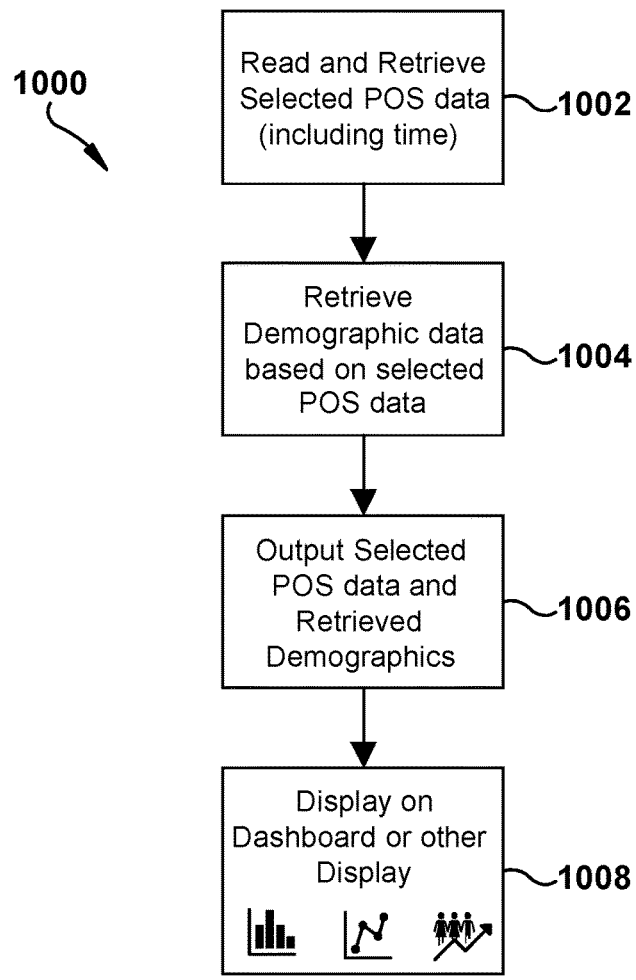
FIG. 10 illustrates another embodiment of logic for analyzing sales and demographic data.

FIG. 10 illustrates another embodiment of POS and demographic analyses logic and outputs for visualizing the analytics. Logic 1000 begins in block 1002 wherein one or more selections of POS data are input (e.g., by a reading a user input via a graphical user interface, mouse, keyboard, voice, etc. or retrieving a stored selection from computer memory). The selected POS data is retrieved from POS data system 904. In block 1004, demographic information/data is retrieved based on the selected POS data from the Demographic Inferencing Information system 202. In other embodiments, block 1002 can instead read and retrieve selection of demographic information/data and block 1004 can retrieve associated POS data. In many cases, but not all, the association between the POS data and demographic data includes at least one of time(s), date(s), location(s), and/or combinations of the foregoing that are input as analytic criterial in blocks 1002 and/or 1004. That is, POS data and demographic data/information having time(s), date(s), location(s), and/or combinations of the foregoing that fall within the selected time(s), dates(s) and/or location(s) analytic criteria are retrieved for analysis and output visualization (see, e.g., FIG. 11 described below) in block 1006. Block 1008 represents the output visualization and can include, for example, a display or graphic (e.g., chart, etc.) on a dashboard presented on a computer monitor or other output device.

Figure 11:
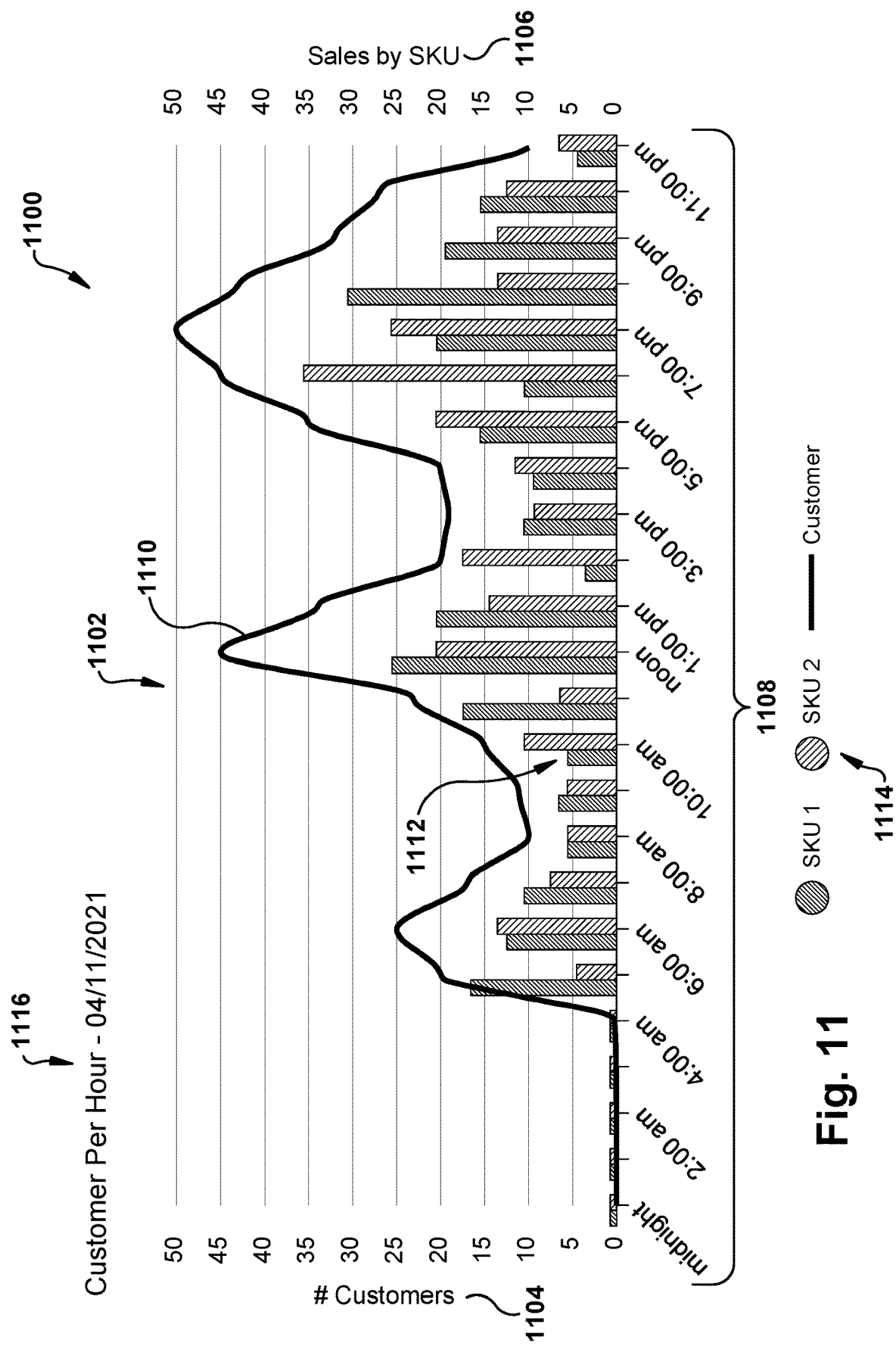
FIG. 11 illustrates one embodiment of an output display, logic and visualization of sales and demographic analyses.

FIG. 11 represents one embodiment of a POS and demographic data analyses, output visualization and display. Embodiment 1100 includes analysis of two criteria (e.g., number customers and sales by SKU's) based on a 24 hour time period (e.g., one day). The analysis can be for one store location or a plurality of store locations. Embodiment 1100 includes a visual graphic 1102 in the form or one or more data plots on a chart. In this embodiment, the left vertical axis (or left y-axis) 1104 represents the number of customers present throughout the day and is associated with customer line plot 1110. The right vertical axis (or right y-axis) 1106 represents the sales by SKU occurring during the selected 24 hour (or one day) time period and associated with SKU bar plots 1112 (representing two SKU's, e.g., SKU 1 and SKU 2). The horizontal or x-axis 1108 represents the hours in the 24 hour time period. This embodiment 1100 of the output visualization can be presented on a dashboard display of a computer monitor or display device. In other embodiments, the x and y axes can represent other demographic and/or POS data. For example, left y-axis can instead represent the number of customers within a certain age group(s) (e.g., 18-24) present during the 24 hour time period and line plot for each age group(s) can be plotted. In another example, the left y-axis can instead represent the number of each gender(s) of the customers and so on. Hence, any number and/or type of data plots can be generated based on the selections or criteria input for POS and demographic data analysis and output.

While the present inventions have been illustrated by the description of embodiments thereof, and while the embodiments have been described in considerable detail, it is not the intention of the descriptions to restrict or in any way limit the scope of the appended claims to such detail. Additional advantages and modifications will readily appear to those skilled in the art. For example, demographics can be inferred based on a group of persons instead of a single person. The group demographics can be used to retrieve the targeted audio/visual content or message. Further, a plurality of individuals can be grouped based on one or more common demographics like age range (e.g., 18-24, 25-34, 35-44, 45-54, 55-64, 65 or more years old), gender (e.g., female, male, and unknown), household income (e.g., top 10%, 11-20%, 21-30%, 31-40%, 41-50%, lower 50%, and unknown), parental status (e.g., parent, not a parent, and unknown). In this group-based embodiment, the logic treats multiple individuals as a group. The logic separates the captured images of people in a group into an array or plurality of images. For example, a group of 5 people becomes 5 separate facial or person images uploaded to the sever for demographic inferencing and grouping based on desired demographic criteria. Since the array length (or number of persons in the group is known), the logic assigns or uploads a "group" number to the array so a message or advertisement that targets a group of people, for example an amusement park, or family vacation, could be presented to the group. From the group number and images, the composition of the group could be determined, e.g., a group of 3 girls and 2 guys and their ages, or mom, dad and the kids. This advantageously matches an advertisement or message with a group captured from the images of the geographic location such as, for example, a family unit. In this manner, audio and/or video messages can be delivered to the geographic location where a group of individuals having one of more common demographics have been captured by the images. Therefore, the invention, in its broader aspects, is not limited to the specific details, the representative apparatus, and illustrative examples shown and described. Accordingly, departures can be made from such details without departing from the spirit or scope of the general inventive concept.

What is claimed:

1. A system for delivering media content to a location comprising:
  a camera for capturing image data in a geographic location;
  logic for extracting facial information from the captured image data;
  logic for inferring demographic information from the facial information, wherein the logic for inferring demographic information comprises logic for determining a year associated with a predetermined age and wherein the predetermined age is less than a present age associated with the facial information extracted from the captured image data;
  logic for selecting at least one type of media based on the inferred demographic information; and
  logic for outputting the selected media to the geographic location.

2. The system of claim 1 wherein the logic for selecting at least one type of media comprises logic for selecting at least one song based on a year associated with a predetermined age related to the facial information.

3. The system of claim 1 wherein the logic for selecting at least one type of media comprises logic for determining if the selected media has already been delivered to the geographic location within a predetermined time period.

4. The system of claim 1 wherein the logic for selecting at least one type of media comprises logic for determining if the facial information has changed within a predetermined time limit and modifying the selected media based on a change.

5. The system of claim 1 wherein the logic for selecting at least one type of media comprises logic for ordering a plurality of facial information and selecting media based on the order.

6. The system of claim 1 wherein the logic for selecting at least one type of media comprises logic for randomly selecting the media when the captured image data does not contain extractable facial information.

7. The system of claim 1 wherein the logic for extracting facial information from the captured image data comprises logic for deleting duplicate facial information.

8. The system of claim 1 wherein the geographic location comprises a retail establishment.

9. The system of claim 1 further including logic for generating at least one demographic data display having a visual graphic representing the demographic data.

10. The system of claim 1 further including logic for generating at least one display having a point of sale and demographic data graphic.

11. A system for delivering media content to a location comprising:
  a camera for capturing image data in a geographic location;
  logic for extracting facial information from the captured image data;
  logic for inferring demographic information from the facial information;
  logic for selecting at least one type of media based on the inferred demographic information, wherein the logic for selecting one type of media comprises logic for selecting at least one song based on a year associated with a predetermined age and wherein the predetermined age is less than a present age associated with the facial information extracted from the captured image data; and
  logic for outputting the selected media to the geographic location.

12. The system of claim 11 wherein the logic for selecting at least one type of media further comprises logic for determining if the facial information has changed within a predetermined time limit and modifying the selected media based on a change.

13. The system of claim 11 wherein the logic for selecting at least one type of media further comprises logic for randomly selecting the media when the captured image data does not contain extractable facial information.

14. The system of claim 11 wherein the logic for extracting facial information from the captured image data comprises logic for deleting duplicate facial information.

15. The system of claim 11 wherein the geographic location comprises a retail establishment.

16. A system for delivering media content to a location comprising:
  a camera for capturing image data in a geographic location;
  logic for extracting facial information from the captured image data;
  logic for inferring demographic information from the facial information;
  logic for selecting at least one type of media based on the inferred demographic information, wherein the logic for selecting at least one type of media comprises logic for determining if the selected media has already been delivered to the geographic location within a predetermined time period and logic for preventing delivery of the selected media if the selected media was delivered within the predetermined time period; and logic for outputting the selected media to the geographic location.

17. The system of claim 16 wherein the logic for selecting at least one type of media further comprises logic for determining if the facial information has changed within a predetermined time limit and modifying the selected media based on a change.

18. The system of claim 16 wherein the logic for selecting at least one type of media further comprises logic for randomly selecting the media when the captured image data does not contain extractable facial information.

19. The system of claim 16 wherein the logic for extracting facial information from the captured image data comprises logic for deleting duplicate facial information.

20. A system for delivering media content to a location comprising:

a camera for capturing image data in a geographic location;

logic for extracting facial information from the captured image data;

logic for inferring demographic information from the facial information;

logic for selecting at least one type of media based on the inferred demographic information, wherein the logic for selecting at least one type of media comprises logic for queuing a plurality of facial information based on the captured image data and selecting media based on the queue; and logic for outputting the selected media to the geographic location based on the queued facial information.

* * * * *